Dec. 4, 1923.
G. A. BUTTRESS
1,476,050
APPARATUS FOR HANDLING FRESHLY FORMED SECTIONS OF PLASTER BOARD
Filed Aug. 30, 1921   2 Sheets-Sheet 2
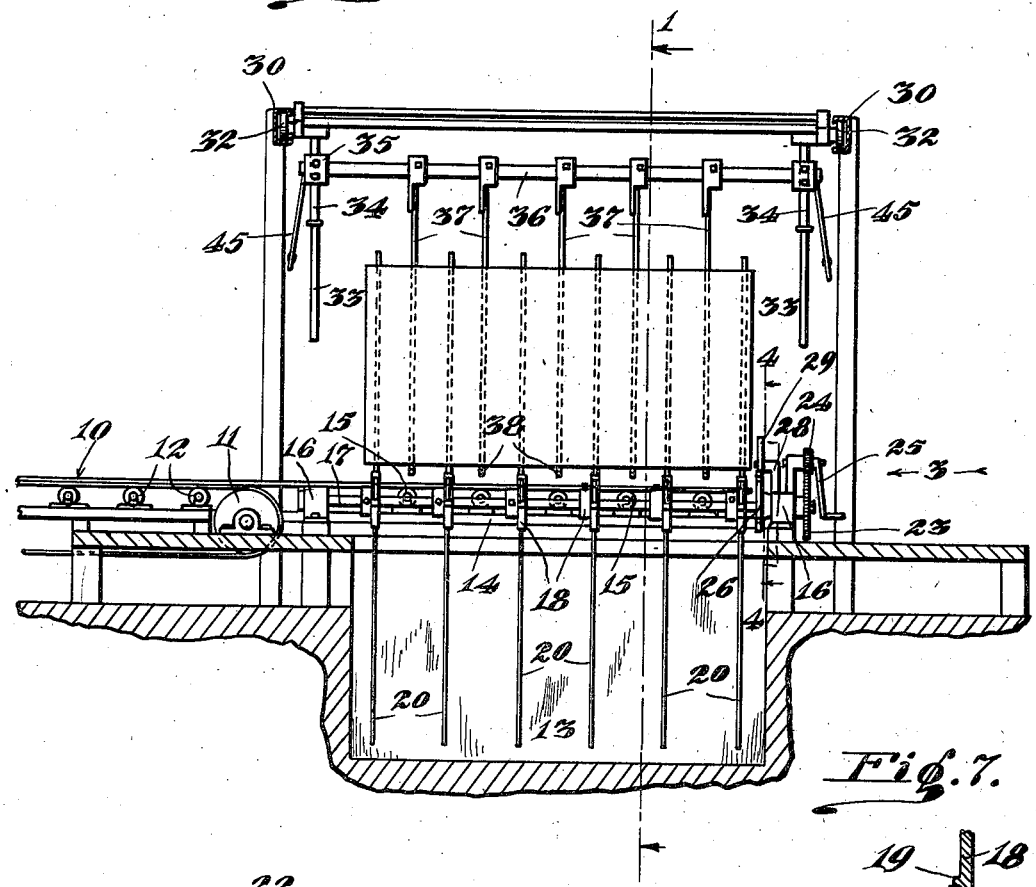
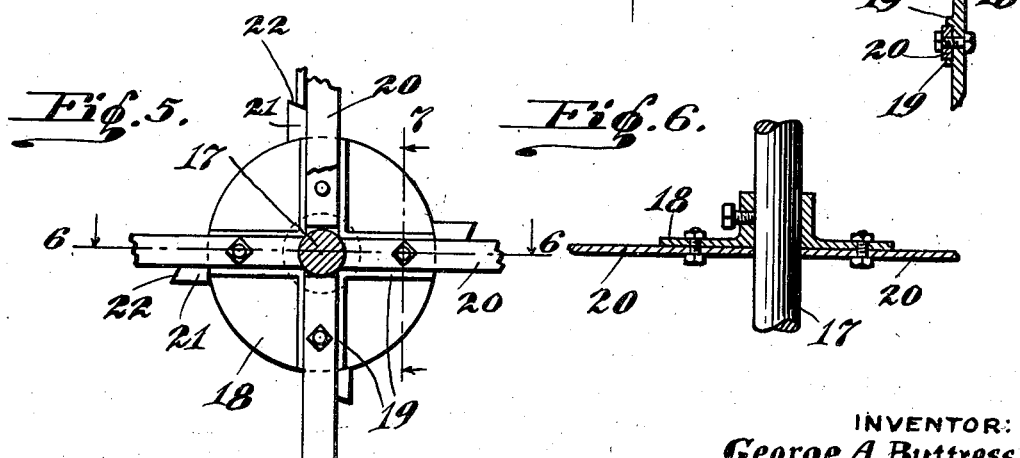
INVENTOR:
George A. Buttress,
BY
ATT'Y.

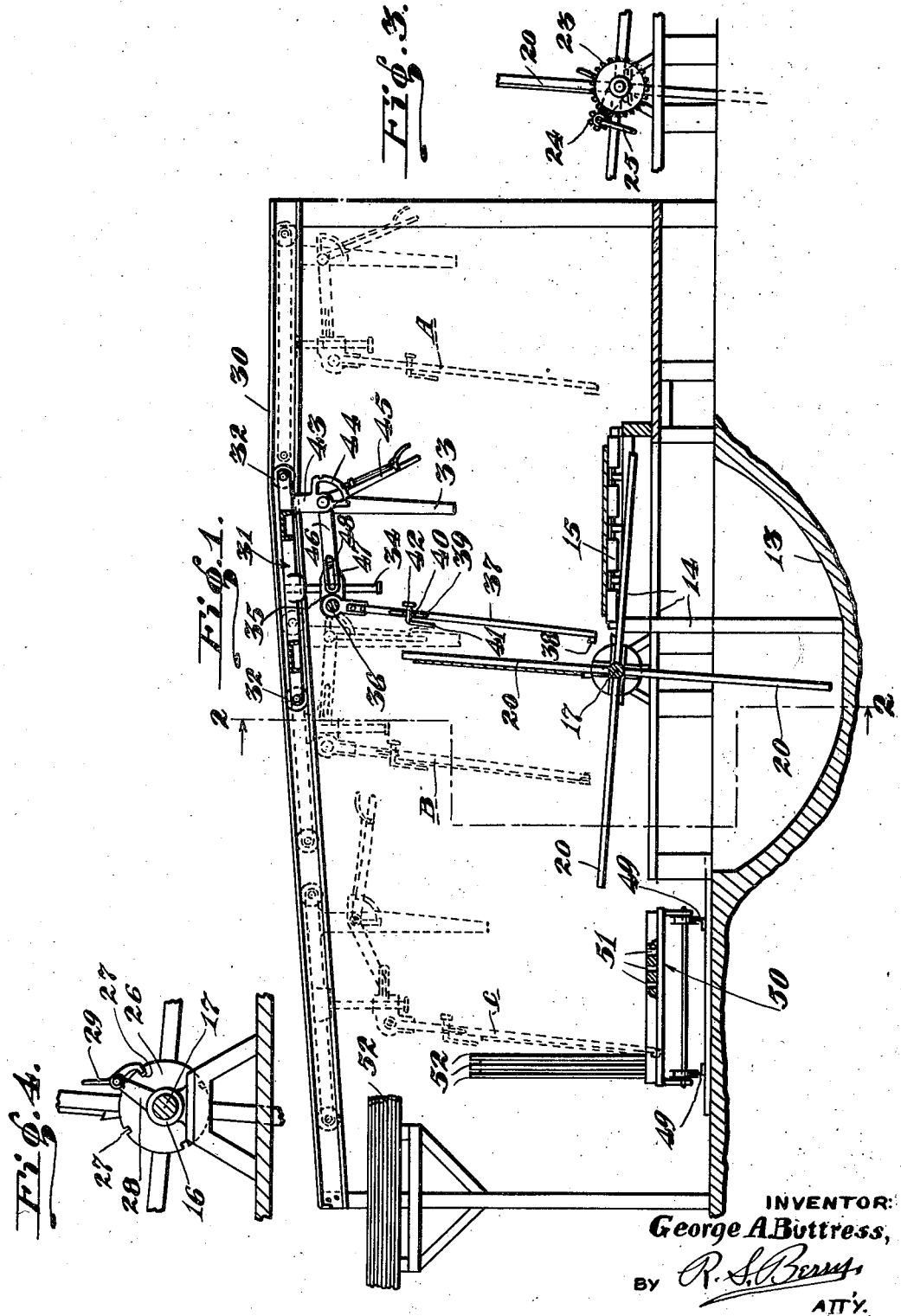

Patented Dec. 4, 1923.

1,476,050

UNITED STATES PATENT OFFICE.

GEORGE A. BUTTRESS, OF LOS ANGELES, CALIFORNIA, ASSIGNOR TO BUTTRESS MANUFACTURING COMPANY, A CORPORATION OF CALIFORNIA.

APPARATUS FOR HANDLING FRESHLY-FORMED SECTIONS OF PLASTER BOARD.

Application filed August 30, 1921. Serial No. 497,057.

*To all whom it may concern:*

Be it known that I, GEORGE A. BUTTRESS, a citizen of the United States, residing at Los Angeles, in the county of Los Angeles and State of California, have invented new and useful Improvements in an Apparatus for Handling Freshly-Formed Sections of Plaster Board, of which the following is a specification.

My invention relates to an apparatus for handling freshly formed sections of plaster board or the like, the principal objects of my invention being to provide a relatively simple practical and efficient mechanism and by means of which, sections of plaster board or the like, in "green" condition may be very easily and quickly lifted from a conveyor, and then engaged and transferred to a suitable carrier and which latter, when loaded may be run into a kiln or drying room.

Other objects of my invention are to provide a plaster board handling apparatus that may be easily and cheaply installed, to provide an apparatus that renders it unnecessary for the hands of the operator to make a contact with the wet or "green" plaster board and further to provide an apparatus of the character referred to that will be effective in eliminating much of the time and labor ordinarily involved in the transferring of plaster board and the like from a conveyor to the kiln or dry house truck:—

With the foregoing and other objects in view my invention consists in certain novel features of construction and arrangment of parts that will be hereinafter more fully described and claimed and illustrated in the accompanying drawings in which:

Fig. 1 is an elevational view partly in cross section of a plaster board handling apparatus of my improved construction.

Fig. 2 is a vertical section taken on the line 2—2 of Fig. 1.

Fig. 3 is a detail elevational view, taken looking in the direction indicated by the arrow 3 in Fig. 2.

Fig. 4 is an enlarged detail section taken on the line 4—4 of Fig. 2.

Fig. 5 is an elevational view of one of the hubs of the reel.

Fig. 6 is a horizontal section taken on the line 6—6 of Fig. 5.

Fig. 7 is a detail section taken on the line 7—7 of Fig. 5.

Referring by numerals to the accompanying drawings:

10 designates a horizontally disposed endless conveyor that leads from the plaster board forming mechanism and which operates over a suitable drum 11, and supporting rollers 12. Drum 11 is elevated at the discharge end of the conveyor and formed in the ground just beyond said discharge end is a pit 13.

Arranged on a suitable supporting framework 14 over that portion of the pit that is directly to the rear of the conveyor is a series of rollers 15, spaced at suitable distances apart and which are adapted to support the sections of plaster board that discharge from the end of the conveyor. Journalled in bearings 16 that are positioned at the sides of the pit 13 and directly in front of the rollers 15 is a shaft 17, on which is fixed a series of disc hubs 18, suitably spaced apart and formed on one side of each hub are pairs of radially disposed ribs 19. Positioned between each pair of ribs and rigidly fixed to the hubs are the inner ends of radial arms 20, there being four arms on each hub and said arms being adapted to move between the spaced rollers 15 when shaft 17 is rotated.

The hubs 18 are secured to shaft 17 so that the arms 20 are aligned in sets lengthwise of the shaft, thereby forming four skeleton lifting frames that are adapted to engage a section of plaster board on the rollers 15 and lift said board into a substantally vertical position.

Projecting from each hub 18 immediately adjacent to the front edge of each arm 20 is a lug 21 having a bevelled outer edge 22 that forms a seat for the lower edge of the engaged plaster board.

Fixed on one end of shaft 17 is a gear wheel 23, and journalled on a fixed bracket adjacent thereto is a pinion 24 that meshes with said gear wheel and said pinion being fixed to the inner end of a crank handle 25.

Fixed on shaft 17 adjacent to said gear wheel is a disc 26 having notches 27 formed in its edge said notches being arranged approximately 90° apart.

Pivotally mounted on a bracket 28 is a detent 29 the point of which is adapted to enter the notches 27, thereby holding the shaft 17 against rotation. The relative positions of the notches 27 and 29 with respect to the sets of arms 20 is such that when the shaft is locked against rotation the upper set of arms or those projecting upwardly from the shaft 17, are slightly inclined toward the rollers 15. (See Fig. 1.)

Arranged on suitable supports above the pit 13 and end of the conveyor 10 is a pair of transversely disposed rails 30, preferably channel shape in cross section with their flanges inwardly presented, and from a point above the conveyor 10 these rails gradually decline toward one end. The opposite or shorter end portions of the rails occupy horizontal positions.

A skeleton frame 31 is provided on its ends with rollers 32 that are arranged within the channel shaped rails and thus an overhead carriage is provided that may be moved from one end of the track formed by the rails 30, to the other end.

Depending from the ends of the carriage thus formed are fixed handles 33, by means of which said carriage is moved upon the overhead track.

Depending from the sides of the carriage 31 are fixed guide rods 34 and arranged to slide freely thereupon are blocks 35 in which are fixed ends of a horizontally disposed shaft 36.

Depending from this shaft is a series of arms 37 that occupy positions between the points of travel of the arms 20 and formed on the front sides of the lower ends of said arms 37 are lugs 38 having inclined top surfaces.

Formed in the upper portions of the two outer arms 37 are slots 39 in each of which is arranged for sliding movement a block 40 having a depending finger 41 on the front side of the arm and a handle 42 on the rear side of said arm.

Depending from the ends of the carriage 31 are brackets 43 to which are fixed segments 44, each having formed in its edge three notches, spaced at suitable distances apart.

Pivotally arranged on each bracket 43 is a hand lever 45 having a latch that is adapted to engage in the notches in the adjacent segment.

Projecting from the pivoted end of each lever 45 is an arm 46 having a slot 47 that receives a pin 48 and the latter being seated in the adjacent block 35. The parts just described provide means for sliding the blocks 35 vertically on the rods 34 and for raising and lowering the arms 37.

Leading from the front side of pit 13 is a track 49 upon which is adapted to operate, trucks such as 50 and the latter being provided in their floors with apertures 51 that are adapted to receive plaster board spacing members 52. A supply of these spacing members may be arranged on a suitable support 53 that is positioned adjacent to the loading point for the truck.

The operation of my improved apparatus is as follows:

While a section of plaster board is being delivered onto the rollers 15, carriage 31 and parts carried thereby occupy the positions as shown by dotted lines A Fig. 1. When the section of plaster board has been delivered onto the rollers 15 detent 29 is released and gear wheel 23 and shaft 17 is rotated approximately a quarter of a complete revolution, thereby moving a set of the arms 20 upwardly between the rollers 15, engaging and lifting the section of board that is positioned on said rollers and carrying said section of board upwardly into a substantially vertical plane, though slightly inclined rearwardly. Detent 29 is then engaged in a notch in disc 26 thereby locking shaft 17 and parts carried thereby. By pulling forwardly on handles 33 the carriage is drawn into position where the arms 37 occupy positions immediately to the rear of the supported plaster board section.

Levers 45 are now manipulated to lower blocks 35 on rods 34 thereby lowering shaft 36 and arms 37 and as the latter are gradually moved forward they will engage the rear side of the plaster board and the lugs 38 will engage the lower edge thereof and thus the section of board will be transferred from arms 20 to arms 37 and by the latter the board will be carried forwardly and downwardly as carriage continues to travel down the inclined portions of the rails 30. When the board is engaged by the arms 37, the finger 41 is elevated and then permitted to descend thereby engaging the upper edge of the board section and retaining it on the arms 37.

After the board is transferred to the arms 37 levers 45 are manipulated to slightly elevate the shaft 36 and parts carried thereby so that as the arms 37 carrying the board section pass over the horizontal arms of the reel they will occupy the slightly elevated positions as shown by dotted lines B Fig. 1. When the carriage reaches a position directly over the truck 50, levers 45 are actuated to lower blocks 35 on rods 34 thus permitting shaft 36 and carried parts to lower into the positions shown by dotted lines C in Fig. 1 and consequently permitting the carried plaster board section to be discharged in a vertical position onto the truck. In order to maintain the board section in vertical positions on the truck, spacing strips 52 are arranged between the board sections with the lower ends of said strips seated in the apertures 51 in the truck floor.

Thus it will be seen that I have provided a relatively simple practical and easily operated apparatus, with which newly formed or "green" plaster board sections may be rapidly transferred from a conveyor to a drying room truck and which operation is accomplished entirely with mechanical devices and without the direct engagement or contact between the hands of the operators and the plaster board sections.

Obviously minor changes in the size, form and construction of the various parts of my improved plaster board handling apparatus may be made and substituted for those herein shown and described without departing from the spirit of the invention as set forth in the appended claims.

I claim as my invention:

1. In an apparatus for handling plaster board sections, a conveyor, a reel adapted to receive the plaster board sections from said conveyor, a carrier and means for lifting the sections from said reel and depositing them onto said carrier.

2. The combination with a rolling support onto which sections of plaster board are delivered, a reel arranged for operation adjacent to said rolling support and adapted to engage and lift the sections of plaster board, a carrier and means operating above the reel for engaging the plaster board sections and delivering the same to said carrier.

3. The combination with a support onto which plaster board sections are delivered of a reel arranged for operation adjacent to said support, the arms of which reel are adapted to engage and lift the board sections from said support and means for engaging and lifting the board sections from said reel and carrying said sections to a point of discharge beyond said reel.

4. In a plaster board handling apparatus, a reel for engaging and lifting plaster board sections a carriage arranged for operation above said reel, and adjustable means carried by said carriage for engaging and lifting the sections of plaster board carried by said reel.

5. In a plaster board handling apparatus, a reel for engaging and lifting plaster board sections a carriage arranged for operation above said reel, and adjustable means carried by said carriage for engaging, lifting the sections of plaster board carried by said reel, and means on said adjustable means for securing the engaged section of plaster board thereupon.

6. In a plaster board handling mechanism a reel for engaging and lifting plaster board sections a carriage arranged for operation above said reel and manually operable vertically and moveable means carried by said carriage for engaging and lifting the plaster board sections from said reel.

7. In a plaster board handling machine, a rotary reel, means for rotating said reel with an intermittent movement, arms on said reel adapted to engage a section of plaster board and lift it from substantially a horizontal position to approximately an upright position, means for holding said reel in a stationary position at a point in its path of rotation such that the upright plaster board section will be supported at a slight rearward inclination when the reel is stationary so that the plaster board may be lifted from the reel in an upright position.

8. In a machine for handling freshly formed plaster board, a plaster board conveyor, spaced carrier rollers onto which plaster board sections are positioned by said conveyor, a rotary shaft, a plurality of sets of radial arms fixed on said shaft and arranged to pass upwardly between the carrier rollers on rotation of the shaft, to lift sections of plaster board therefrom, adjacent sets of said arms extending at right angles to each other whereby when one set of the arms is extended substantially vertical the adjacent sets will extend substantially horizontal with one of the latter sets located beneath a section of plaster board on the carrier rollers, and whereby a section of plaster board carried by the vertical arms may be removed therefrom and carried in a substantially upright position over the other set of horizontal arms.

9. In a machine for handling freshly formed plaster board, a plaster board conveyor, spaced carrier rollers onto which plaster board sections are positioned by said conveyor, a rotary shaft, a plurality of sets of radial arms fixed on said shaft and arranged to pass upwardly between the carrier rollers on rotation of the shaft, to lift sections of plaster board therefrom, adjacent sets of said arms extending at right angles to each other whereby when one set of arms is extended substantially vertical the adjacent sets will extend substantially horizontal with one of the latter sets located beneath a section of plaster board on the carrier rollers, and whereby a section of plaster board carried by the vertical arms may be removed therefrom and carried in a substantially upright position over the other set of horizontal arms, and means for lifting and carrying the plaster board section from said vertical arms.

10. In a mechanism for handling green plaster board, a conveyor, carrier rollers to which sections of plaster board may be delivered from said conveyor in a flat position, a rotary shaft, a set of arms carried by said shaft arranged to pass upwardly between said rollers on rotation of the shaft to lift a section of plaster board therefrom and carry it to substantially an upright position, and means for holding said shaft stationary with the arms carrying the plaster board section disposed in substantially an upright position whereby the plaster board section may be lifted, removed and carried from the arms while in substantially an upright position.

GEORGE A. BUTTRESS.